Dec. 1, 1953  C. R. HAGEN  2,660,851
COTTON PICKER SPINDLE ASSEMBLY MOUNTING
Filed April 3, 1951
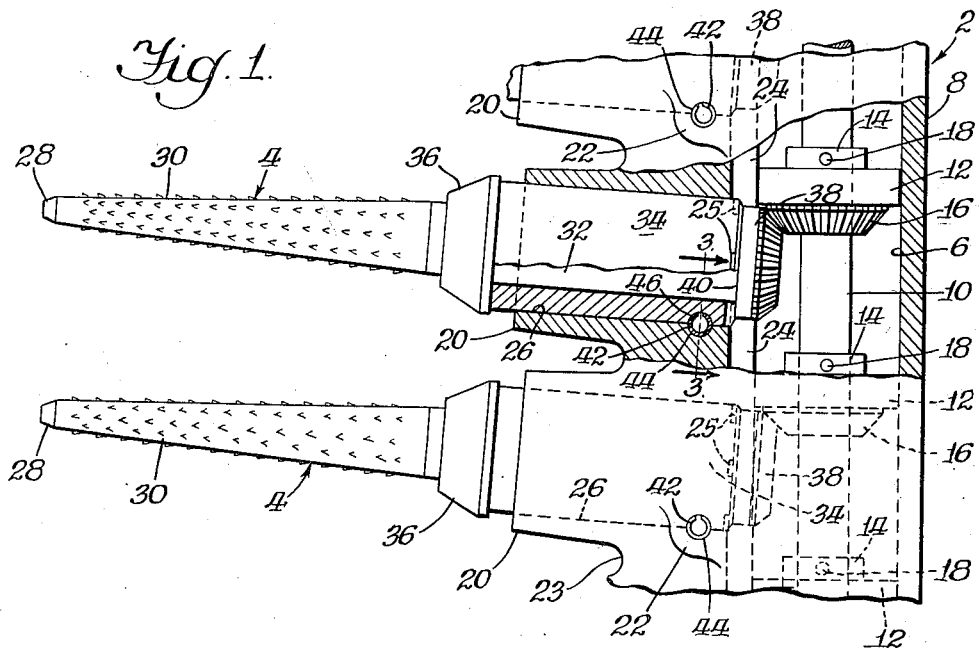
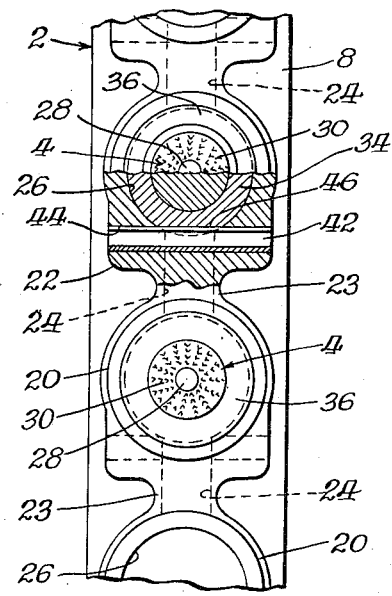
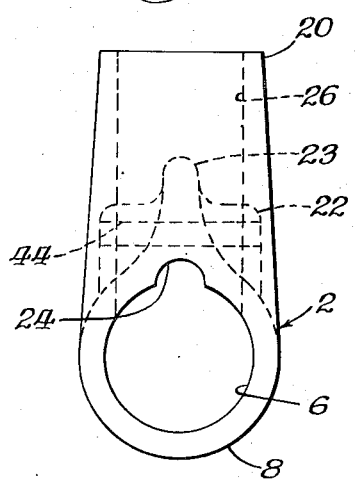
INVENTOR.
Clarence R. Hagen
BY Paul O. Pippel
Atty.

Patented Dec. 1, 1953

2,660,851

UNITED STATES PATENT OFFICE 2,660,851

COTTON PICKER SPINDLE ASSEMBLY MOUNTING

Clarence R. Hagen, Memphis, Tenn., assignor to International Harvester Company, a corporation of New Jersey Application April 3, 1951, Serial No. 218,935

4 Claims. (Cl. 56—41)

This invention relates to cotton pickers and more specifically to an improved mounting for the picking spindle assemblies thereof.

The invention is applicable to a cotton harvester of the type shown in E. A. Johnston United States Patent 2,140,631, wherein the picker drum comprises a plurality of bars, each of which rotatably supports a number of gathering spindles. These bars are invariably formed of aluminum to conserve weight and to facilitate casting and machining, whereas the spindles, which are most subject to wear, are formed of steel.

Various attempts have been made to develop a satisfactory economical mounting for these spindle assemblies which would be simple to put together and dismantle and yet provide a tight connection. The connections presently in use comprise a nut sleeved onto a bearing which carries the spindle, the nut having end thrust engagement with the bearing and being threaded into the bar. Replacement of a spindle involves unthreading and threading of the nut, which soon wears out the thread in the soft aluminum constituting the bar and/or the nut if that too is aluminum. Threading of two aluminum pieces involves the possibility of stripping by crossthreading and is accompanied by a gripping action at the threads which results in their rapid destruction.

Furthermore, the nut fastening is expensive and tedious to apply and remove especially when involving several hundred assemblies such as are present in cotton pickers currently in use.

In addition, overtightening of the nut frequently subjects the parts to excessive stresses which may cause malfunctioning or even destruction of these parts.

A general object of the invention is to provide a simple and economical mounting which will obviate these difficulties.

A further object is to provide a construction which will not only position the spindle bearing but also effect a tight seating thereof against the supporting member.

Another object is to devise a yielding connection between the supporting member and the spindle assembly which under certain conditions may be automatically adjustable to compensate for manufacturing tolerances whereby coacting parts may be permitted to assume proper working position.

A more specific object is to connect the bearing to the support by a resilient C-shaped pin, the pin extending at its ends into openings in the support and seating intermediate its ends within a tangential slot in the bearing.

A different object is to devise an arrangement wherein the pin provides a torque resistance.

A still further object is to design the connection in such manner that the pin enters the strongest section of the support preferably adjacent to the gear end of the spindle assembly.

Another object is to provide an effective connection between the dissimilar metals constituting the bearing and the support.

These and other objects of the invention will become more apparent from the specification and the drawings, wherein:

Figure 1 is a fragmentary side elevational view of the picker mechanism, partly in vertical cross-section.

Figure 2 is a top plan view thereof with the spindles removed, and

Figure 3 is a fragmentary front view thereof with several of the spindles removed and partly in vertical cross-section substantially on the line 3—3 of Figure 1.

Describing the invention in detail, the spindle carrier or bar 2 is illustrated with several spindle assemblies 4. This spindle carrier or column 2 is but one of several of such members embodied in a cotton picking unit as that shown in the above mentioned United States Patent 2,140,631. Some existing machines employ a cotton picking unit having fifteen of the bar-like carrier members 2, and each of these members 2 in such units is of a length to carry between 14 and 20 of the spindle assemblies 4. Each supporting member 2 is preferably formed of aluminum for reasons heretofore given and comprises a longitudinal central passageway 6 in a tube portion 8 thereof which is preferably cylindrical in shape as seen in Figure 2. A driving shaft 10 is disposed within the channel 6, the shaft being rotatably journaled within a plurality of bearing units 12 which are fitted within the channel 6. These bearing units 12 are preferably disposed about hubs 14 of spindle driving gears 16 secured to the shaft 10 as by a pin 18.

The outer side of each member or support structure 2 is formed with a plurality of vertically spaced spindle-assembly-holders or attachment hubs or sections 20, these hubs merging at their inner extremities with the outer side of the portion 8 of the carrier bar 2. Each hub 20 is preferably cylindrical in shape and at the inner end of its bottom side is widened to at least the extent of its overall diameter to provide a generally rectangular section or embossment 22, the lower end of section 22 being preferably constructed to provide a central depending rib 23 merging into the top side of the hub 20 therebelow in an area adjacent to the inner end thereof. This construction provides a good distribution of metal and eliminates an excessive or bulky construction.

Behind each section 22 and inner end of each hub 20, a vertical groove 24 is formed, the groove intersecting the opening 26 within the associated hub 20. It will be seen that the grooves 24 are continued above and below each opening 26 and collectively constitute lubricating supply means for the spindle assembly bearings as will presently become apparent. Oil is fed into the grooves 24 by a lubricant metering device (not shown) to bearings 34 provided with suitable ports 25 for distributing the oil to required areas and may be shown in C. A. Kallgren United States Patent 2,497,776.

Each of the spindle assemblies 4 includes a spindle member 28 which has an outer conical barbed picking section 30 which at its inner end or base merges into a cylindrical shank or journal portion 32 extending through and journaled in a bearing 34 which fits snugly into the cylindrical opening 26 in an associated hub 20. The outer end of the shank is provided with a guard or cap 36 preferably press-fitted thereon or secured thereto as by a pin. The inner end of the shank is preferably formed integral with a bevel gear 38 which is provided with a flat outer face 40 in engagement with a complementary flat face on the inner edge of the bearing 34. It will be seen that the gear 38 of each spindle assembly 14 is disposed beneath the adjacent driving gear 16 on shaft 10 and is in meshing engagement therewith.

Each spindle assembly 4 is secured to the bar or support 2 by means of a resilient cylindrical pin 42, C-shaped in cross-section which is disposed beneath said spindle assembly 4 and extends substantially horizontally generally perpendicular thereto and at the bottom of the opposite ends thereof bears upon the ends of a substantially horizontal opening 44 within the associated portion 22, the opening 44 being disposed tangential to the adjacent opening 26 and posed intermediate its ends said opening intersecting intermediate its ends said opening 26, and the pin 42 seating on its upper side intermediate its ends within a seat afforded within a transverse tangential slot on notch 46 within the periphery of the bushing 34 adjacent to the inner end thereof.

It will be readily apparent that if the opening 26 is slightly too large for the cylindrical bushing 34 therein, the pin 42, being expansive radially and formed of spring-like material tends, by deflection of its intermediate portion, to urge the bushing 34 against the upper side of the associated opening 26 and at the same time the pin 42, at its end portions, reacts on its bottom side against the bottom side of the associated pin hole or aperture 44 and thus seats tightly thereagainst. It will be seen that the location of the pin in the embossment 22 is at the strongest section of the support 2 and that it is easily accessible from either end for insertion or withdrawal. The pin 42 may, of course, be relocated along the length of bushing 34 to obtain various desired features. The pin 42 may also function under certain conditions to compensate for excess tolerance on the bushing or the bevel gear 38 or gear 16 as, for example, by flexing transversely thereof to allow the associated spindle assembly to move slightly outwardly thereby permitting the parts to assume proper working position. It will also be noted that each spindle assembly 4 is rotated on its longitudinal axis which is disposed angularly or more specifically perpendicular to the axis of the pin and that the arrangement of the pin is such as to provide a torque resistance. An effective self-adjusting resilient connection is provided between the bearing 34 which is preferably formed of bronze and the support 2 which is preferably aluminum and the position of the pin in relation to the gear 38 is such as to insure proper mating of the gear 38 with its associated gear 16 in the event that the opening 26 should ever be loose.

What is claimed is:

1. In a cotton harvester, a picker mechanism including a support with an opening therethrough, a picker spindle assembly having a bearing portion, said bearing portion being fitted into said opening, said bearing portion having a tangential peripheral slot, said support having an aperture in alignment with said slot, and a resilient pin of C-shaped cross section within the slot and said aperture.

2. The combination according to claim 1, and said support extending generally vertically and said picker spindle assembly extending generally horizontally and revolvable on a substantially horizontal axis and said slot disposed at the bottom of said bearing portion and extending substantially perpendicular to said axis of rotation of said picker spindle assembly, and said pin disposed beneath the assembly in direct supporting relationship thereto, and said opening and said bearing portion being cylindrical.

3. The combination according to claim 1, and said support comprising a tube portion, a drive shaft in the tube portion, a bevel gear constrained for rotation with the shaft and positioned adjacent to said opening, said picker spindle assembly including a picker spindle rotatably mounted within said bearing portion and having a bevel gear disposed in meshing relationship with said first-mentioned bevel gear, and said pin abutting said bearing portion at a point diametrically opposite the point of engagement of said bevel gear of the spindle with said first-mentioned bevel gear.

4. The combination according to claim 2 and said bearing portion having an inner edge, and said picker spindle bevel gear having a face in engagement with said inner edge of the bearing portion, and said pin disposed in close proximity to said inner edge and extending lengthwise substantially perpendicular to said spindle.

CLARENCE R. HAGEN.

References Cited in the file of this patent

UNITED STATES PATENTS

| Number | Name | Date |
|---|---|---|
| 877,754 | Bullock | Jan. 28, 1908 |
| 1,147,915 | Ayers, Jr. | July 27, 1915 |
| 2,440,767 | Baker | May 4, 1948 |
| 2,593,671 | Hagen et al. | Apr. 22, 1952 |